US010772324B2

(12) United States Patent
Wacker

(10) Patent No.: US 10,772,324 B2
(45) Date of Patent: Sep. 15, 2020

(54) AQUEOUS ADJUVANT-COMPOSITIONS

(71) Applicant: CLARIANT FINANCE (BVI) LIMITED, Road Town, Tortola (VG)

(72) Inventor: Andreas Wacker, Mannheim (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/439,052

(22) PCT Filed: Nov. 1, 2013

(86) PCT No.: PCT/EP2013/003290
§ 371 (c)(1),
(2) Date: Apr. 28, 2015

(87) PCT Pub. No.: WO2014/067663
PCT Pub. Date: May 8, 2014

(65) Prior Publication Data
US 2015/0320037 A1 Nov. 12, 2015

(30) Foreign Application Priority Data
Nov. 3, 2012 (DE) .......... 10 2012 021 647

(51) Int. Cl.
*A01N 25/30* (2006.01)
*A01N 57/12* (2006.01)
*A01N 39/04* (2006.01)
*A01N 57/20* (2006.01)

(52) U.S. Cl.
CPC ............ *A01N 25/30* (2013.01); *A01N 39/04* (2013.01); *A01N 57/12* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 2,016,962 A | 10/1935 | Flint | |
| 2,667,478 A | 1/1954 | Schwartz | |
| 2,703,798 A | 3/1955 | Schwartz | |
| 2,891,052 A | 6/1959 | Boettner | |
| 2,982,737 A | 5/1961 | Boettner | |
| 2,993,887 A | 7/1961 | Zech | |
| 4,079,078 A | 3/1978 | Collins | |
| 4,400,196 A | 8/1983 | Albrecht | |
| 4,413,087 A | 11/1983 | Bernot | |
| 4,505,827 A | 3/1985 | Rose | |
| 4,565,647 A | 1/1986 | Llenado | |
| 4,654,207 A | 3/1987 | Preston | |
| 4,681,946 A | 7/1987 | Baur | |
| 4,981,684 A * | 1/1991 | MacKenzie | A61K 9/0019 424/193.1 |
| 5,009,814 A | 4/1991 | Kelkenberg | |
| 5,194,639 A | 3/1993 | Connor | |
| 5,254,281 A | 10/1993 | Pichardo | |
| 5,298,195 A | 3/1994 | Brumbaugh | |
| 5,317,047 A | 5/1994 | Sabate | |
| 5,354,425 A | 10/1994 | MacKey | |
| 5,449,770 A | 9/1995 | Shumate | |
| 5,454,982 A | 10/1995 | Murch | |
| 5,500,155 A | 3/1996 | Weuthen | |
| 5,539,134 A | 7/1996 | Strecker | |
| 5,559,078 A * | 9/1996 | Garst | A01N 25/30 424/405 |
| 5,560,873 A | 10/1996 | Chen | |
| 5,625,098 A | 4/1997 | Kao | |
| 5,691,299 A | 11/1997 | Fabry | |
| 5,711,899 A | 1/1998 | Kawa | |
| 5,712,235 A | 1/1998 | Nieendick | |
| 5,716,922 A | 2/1998 | Curry | |
| 5,750,748 A | 5/1998 | Boutique | |
| 5,766,267 A | 6/1998 | Schumacher | |
| 5,777,165 A | 7/1998 | Kao | |

(Continued)

FOREIGN PATENT DOCUMENTS

| CA | 2117007 | 9/1994 |
|---|---|---|
| CA | 1333226 | 11/1994 |

(Continued)

OTHER PUBLICATIONS

Mohammadi et al. Langmuir vol. 20, pp. 9657-9662; publication year: 2004.*
Bezard (Lipids 1971;6:630-634).
Dale et al. (J. Sci. Food. Agric. 1955;6:166-170) (Year: 1955).
English Translation of Cited Excerpts of CN103468382A, Dec. 25, 2013.2 pages.
Friedrich Vogel: "Kosmetik aus der Sicht des Chemikers", Chemie in Unserer Zeit, No. 5, Jan. 1, 1986, pp. 156-164, XP055109030, DOI: 10.1002/ciuz.19860200504 p. 160.
Hardcopy of http://igf-bingen.de/Croda_produkte.pdf, Dec. 1, 2016. 3 pages.

(Continued)

*Primary Examiner* — Katherine Peebles
(74) *Attorney, Agent, or Firm* — Tod A. Waldrop

(57) ABSTRACT

The invention relates to an aqueous adjuvant composition containing: a) one or more alkyl glucamides of formula (I) wherein R1 is a linear or branched alkyl group with five to nine carbon atoms and R2 is an alkyl group with one to three carbon atoms; b) water; c) optionally a co-solvent. The invention further relates to the use of such compositions to increase the biological activity of pesticides, preferably of herbicides, and to produce an aqueous pesticide composition.

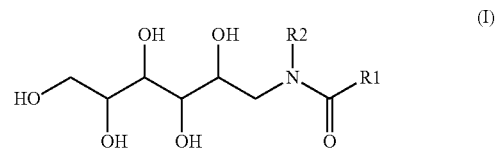

(I)

13 Claims, No Drawings

(56) References Cited

U.S. PATENT DOCUMENTS

| | | |
|---|---|---|
| 5,789,372 A | 8/1998 | Fabry |
| 5,874,096 A | 2/1999 | Hazen |
| 5,945,389 A | 8/1999 | Richard |
| 6,147,045 A | 11/2000 | Lappas |
| 6,147,124 A | 11/2000 | Ansmann |
| 6,165,955 A | 12/2000 | Chen |
| 6,264,961 B1 | 7/2001 | Ansmann |
| 6,274,126 B1 | 8/2001 | Newell |
| 6,288,023 B1 | 9/2001 | Honda |
| 6,329,331 B1 | 12/2001 | Aronson |
| 6,350,788 B1 | 2/2002 | Herold |
| 6,391,962 B2 | 5/2002 | Zerrer |
| 6,455,001 B1 | 9/2002 | Knappe |
| 6,635,708 B1 | 10/2003 | Papenfuhs |
| 6,727,217 B1 | 4/2004 | Nieendick |
| 6,887,838 B2 | 5/2005 | Dykstra |
| 6,903,057 B1 | 6/2005 | Tsaur |
| 7,056,379 B2 | 6/2006 | Nieendick |
| 7,217,752 B2 | 5/2007 | Schmucker-Castner |
| 7,250,392 B1 | 7/2007 | Leonard |
| 7,297,666 B2 | 11/2007 | Kuepper |
| 7,407,667 B2 | 8/2008 | Zerrer |
| 7,578,995 B2 | 8/2009 | Frantz |
| 7,776,318 B2 | 8/2010 | Bissey-Beugras |
| 7,820,771 B2 | 10/2010 | Lapra |
| 7,872,036 B2 | 1/2011 | Toriyabe |
| 7,897,543 B2 | 3/2011 | Bretschneider |
| 8,084,452 B2 | 12/2011 | Jeschke |
| 8,178,481 B2 | 5/2012 | Sans |
| 8,263,538 B2 | 9/2012 | Tsaur |
| 8,324,390 B2 | 12/2012 | Fischer |
| 8,404,855 B2 | 3/2013 | Jeschke |
| 8,536,340 B2 | 9/2013 | Hamamoto |
| 8,637,432 B2 | 1/2014 | Baur |
| 8,729,323 B2 | 5/2014 | Kothandaraman |
| 8,759,255 B2 | 6/2014 | Wacker |
| 8,809,547 B2 | 8/2014 | Bretschneider |
| 8,901,041 B2 | 12/2014 | Frisch |
| 9,187,407 B2 | 11/2015 | Koshti |
| 9,504,636 B2 | 11/2016 | Klug |
| 9,949,909 B2 | 4/2018 | Klug |
| 10,172,774 B2 | 1/2019 | Klug |
| 10,265,253 B2 | 4/2019 | Klug |
| 2001/0023298 A1 | 9/2001 | Weinelt |
| 2002/0004476 A1 | 1/2002 | Pancheri |
| 2002/0065198 A1 | 5/2002 | Highsmith |
| 2002/0168417 A1 | 11/2002 | Blease et al. |
| 2003/0004929 A1 | 1/2003 | Julian |
| 2003/0049292 A1 | 3/2003 | Turowski-Wanke |
| 2003/0069153 A1 | 4/2003 | Jordan |
| 2003/0199403 A1 | 10/2003 | Wells |
| 2004/0086470 A1 | 5/2004 | Nieendick |
| 2005/0037926 A1 | 2/2005 | Zerrer |
| 2005/0037942 A1 | 2/2005 | Otterson |
| 2005/0172859 A1 | 8/2005 | Nieendick |
| 2006/0058205 A1 | 3/2006 | Ainger |
| 2006/0079414 A1 | 4/2006 | Nieendick |
| 2006/0100127 A1 | 5/2006 | Meier |
| 2006/0110415 A1 | 5/2006 | Gupta |
| 2006/0110432 A1 | 5/2006 | Luu |
| 2006/0135382 A1 | 6/2006 | Molenda |
| 2006/0142291 A1 | 6/2006 | Beilfuss |
| 2006/0166826 A1 | 7/2006 | Zerrer |
| 2006/0171979 A1 | 8/2006 | Calvo |
| 2007/0060489 A1 | 3/2007 | Sun |
| 2007/0128144 A1 | 6/2007 | Bonastre |
| 2007/0190004 A1 | 8/2007 | Bockmuhl |
| 2007/0213226 A1 | 9/2007 | Sieverding |
| 2009/0023622 A1 | 1/2009 | Leidreiter |
| 2009/0111847 A1 | 4/2009 | Li |
| 2009/0124498 A1 | 5/2009 | Von Deyn |
| 2009/0253612 A1 | 10/2009 | Mushock |
| 2009/0257972 A1 | 10/2009 | Dieker |
| 2010/0051200 A1 | 3/2010 | Mueller |
| 2010/0285077 A1 | 11/2010 | Lintner |
| 2011/0002865 A1 | 1/2011 | Fournial |
| 2011/0150786 A1 | 6/2011 | Desenne |
| 2011/0177945 A1 | 7/2011 | Klingelhoefer |
| 2011/0251116 A1 | 10/2011 | Aehle |
| 2012/0009127 A1 | 1/2012 | Dasgupta |
| 2012/0010113 A1 | 1/2012 | Hee |
| 2012/0094890 A1 | 4/2012 | Anantaneni |
| 2012/0172223 A1 | 7/2012 | Wacker |
| 2012/0244092 A1 | 9/2012 | Moser |
| 2013/0030197 A1 | 1/2013 | Harichian |
| 2013/0189212 A1 | 7/2013 | Jawale |
| 2013/0216491 A1 | 8/2013 | Ogihara |
| 2014/0255330 A1 | 9/2014 | Cron |
| 2014/0303389 A1 | 10/2014 | Crosby |
| 2015/0032003 A1 | 1/2015 | Cho |
| 2015/0125415 A1 | 5/2015 | Klug |
| 2015/0126424 A1 | 5/2015 | Klug |
| 2015/0126616 A1 | 5/2015 | Klug |
| 2015/0133560 A1 | 5/2015 | Klug |
| 2015/0140048 A1 | 5/2015 | Klug |
| 2015/0141466 A1 | 5/2015 | Klug |
| 2015/0141508 A1 | 5/2015 | Klug |
| 2015/0150767 A1 | 6/2015 | Klug |
| 2015/0164755 A1 | 6/2015 | Klug |
| 2015/0164756 A1 | 6/2015 | Klug |
| 2015/0282478 A1 | 10/2015 | Baur |
| 2015/0320037 A1 | 11/2015 | Wacker |
| 2015/0335550 A1 | 11/2015 | Koshti |
| 2016/0074310 A1 | 3/2016 | Klug |
| 2016/0136072 A1 | 5/2016 | Klug |
| 2016/0143828 A1 | 5/2016 | Klug |
| 2016/0243014 A1 | 8/2016 | Dahms |
| 2016/0272666 A1 | 9/2016 | Klug |
| 2016/0361243 A1 | 12/2016 | Klug |
| 2017/0000710 A1 | 1/2017 | Klug |
| 2017/0002297 A1 | 1/2017 | Klug |
| 2017/0044434 A1 | 2/2017 | Baur |
| 2017/0055524 A1 | 3/2017 | Baur |
| 2017/0071199 A1 | 3/2017 | Baur |
| 2017/0101606 A1 | 4/2017 | Klug |
| 2017/0218293 A1 | 8/2017 | Klug |
| 2017/0226349 A1 | 8/2017 | Kupfer |
| 2017/0265477 A1 | 9/2017 | Baur |
| 2017/0292062 A1 | 10/2017 | Wylde |
| 2017/0305838 A1 | 10/2017 | Appel |
| 2018/0215879 A1 | 8/2018 | Kupfer |
| 2019/0076344 A1 | 3/2019 | Klug |

FOREIGN PATENT DOCUMENTS

| | | |
|---|---|---|
| CA | 2127644 | 1/1995 |
| CN | 1061960 | 6/1992 |
| CN | 1077489 | 10/1993 |
| CN | 1078746 | 11/1993 |
| CN | 1088258 | 6/1994 |
| CN | 1140987 | 1/1997 |
| CN | 1141653 | 1/1997 |
| CN | 1155239 | 7/1997 |
| CN | 1292641 | 4/2001 |
| CN | 1296524 | 5/2001 |
| CN | 1501772 | 6/2004 |
| CN | 1518408 | 8/2004 |
| CN | 1594518 | 3/2005 |
| CN | 100528887 C | 5/2006 |
| CN | 1997341 | 7/2007 |
| CN | 102186340 | 9/2011 |
| CN | 102595882 | 7/2012 |
| CN | 103468362 | 12/2013 |
| CN | 103468382 | 12/2013 |
| CN | 104918490 | 9/2015 |
| DE | 1956509 | 5/1971 |
| DE | 2226872 A1 | 12/1973 |
| DE | 4235783 | 4/1994 |
| DE | 4435383 | 11/1995 |
| DE | 19507531 | 9/1996 |
| DE | 19701127 | 7/1998 |
| DE | 19916090 | 10/2000 |
| DE | 10117993 | 10/2002 |
| DE | 10130357 | 1/2003 |

(56) References Cited

FOREIGN PATENT DOCUMENTS

| | | |
|---|---|---|
| DE | 102007034438 | 1/2009 |
| DE | 202013011412 | 1/2014 |
| DE | 202013011413 | 1/2014 |
| DE | 102012021647 | 5/2014 |
| EP | 0048436 | 3/1982 |
| EP | 0285768 | 10/1988 |
| EP | 0285786 | 10/1988 |
| EP | 0336151 | 10/1989 |
| EP | 0378985 | 7/1990 |
| EP | 0407874 | 1/1991 |
| EP | 0539588 | 5/1993 |
| EP | 0550637 | 7/1993 |
| EP | 0572723 | 12/1993 |
| EP | 0614881 | 9/1994 |
| EP | 0633244 | 1/1995 |
| EP | 0709449 | 5/1996 |
| EP | 0745719 | 12/1996 |
| EP | 0769548 A1 | 4/1997 |
| EP | 0774503 A1 | 5/1997 |
| EP | 0995994 | 4/2000 |
| EP | 1043017 | 10/2000 |
| EP | 1078978 | 2/2001 |
| EP | 1093722 | 4/2001 |
| EP | 1110944 | 6/2001 |
| EP | 1177223 | 2/2002 |
| EP | 1379129 | 1/2004 |
| EP | 1676831 | 7/2006 |
| EP | 1716842 | 11/2006 |
| JP | S4810053 B | 2/1973 |
| JP | S63270534 | 11/1988 |
| JP | H06501731 | 2/1994 |
| JP | H06501733 | 2/1994 |
| JP | H06240599 | 8/1994 |
| JP | H07507341 | 8/1995 |
| JP | H0812993 | 1/1996 |
| JP | H0848618 | 2/1996 |
| JP | H09502476 | 3/1997 |
| JP | H09506683 | 6/1997 |
| JP | H09510956 | 11/1997 |
| JP | H10501279 | 2/1998 |
| JP | H10508043 | 8/1998 |
| JP | H11505839 | 5/1999 |
| JP | H11246890 | 9/1999 |
| JP | H11512334 | 10/1999 |
| JP | 2000512286 | 9/2000 |
| JP | 2000297028 | 10/2000 |
| JP | 2001501635 | 2/2001 |
| JP | 2001131579 | 5/2001 |
| JP | 2001247528 | 9/2001 |
| JP | 2002542344 A | 12/2002 |
| JP | 2006183030 | 7/2006 |
| JP | 2006183039 | 7/2006 |
| JP | 2007538023 | 12/2007 |
| JP | 2008110953 | 5/2008 |
| JP | 2010018586 | 1/2010 |
| JP | 2013534232 | 9/2013 |
| JP | 2014532815 | 12/2014 |
| JP | 2015518026 | 6/2015 |
| JP | 2017526776 | 9/2017 |
| WO | 9205764 A1 | 4/1992 |
| WO | 9206073 | 4/1992 |
| WO | 9206154 | 4/1992 |
| WO | 9206158 | 4/1992 |
| WO | 9206158 A1 | 4/1992 |
| WO | 9206161 | 4/1992 |
| WO | 9206161 A1 | 4/1992 |
| WO | 9206162 A1 | 4/1992 |
| WO | 9318125 | 9/1993 |
| WO | 9319149 | 9/1993 |
| WO | 9410130 | 5/1994 |
| WO | 9412608 | 6/1994 |
| WO | 9412609 | 6/1994 |
| WO | 9419941 | 9/1994 |
| WO | 9516824 | 6/1995 |
| WO | 9517880 A1 | 7/1995 |
| WO | 9519415 | 7/1995 |
| WO | 9523840 | 9/1995 |
| WO | 9533033 | 12/1995 |
| WO | 9533035 | 12/1995 |
| WO | 9603974 | 2/1996 |
| WO | 9603974 A1 | 2/1996 |
| WO | 9610386 | 4/1996 |
| WO | 9614374 | 5/1996 |
| WO | 9616540 | 6/1996 |
| WO | 9628023 | 9/1996 |
| WO | 9637589 | 11/1996 |
| WO | 9637592 | 11/1996 |
| WO | 9747284 A1 | 12/1997 |
| WO | 9800496 | 1/1998 |
| WO | 9800496 A1 | 1/1998 |
| WO | 9841601 | 9/1998 |
| WO | 9856496 | 12/1998 |
| WO | 9951716 | 10/1999 |
| WO | 0065014 | 11/2000 |
| WO | 0137658 | 5/2001 |
| WO | 0160877 | 8/2001 |
| WO | 02089575 | 11/2002 |
| WO | 2002096882 | 12/2002 |
| WO | 03000055 | 1/2003 |
| WO | 2003106457 | 12/2003 |
| WO | 2004056358 | 7/2004 |
| WO | 2004099150 | 11/2004 |
| WO | 2004099160 | 11/2004 |
| WO | 2005035486 | 4/2005 |
| WO | 2005063094 | 7/2005 |
| WO | 2005077934 | 8/2005 |
| WO | 2005117580 | 12/2005 |
| WO | 2006043635 | 4/2006 |
| WO | 2006056433 | 6/2006 |
| WO | 2006089633 | 8/2006 |
| WO | 2006100288 | 9/2006 |
| WO | 2007040280 | 4/2007 |
| WO | 2007057407 | 5/2007 |
| WO | 2007075459 | 7/2007 |
| WO | 2007101369 | 9/2007 |
| WO | 2007115643 | 10/2007 |
| WO | 2007115644 | 10/2007 |
| WO | 2007115646 | 10/2007 |
| WO | 2007141066 | 12/2007 |
| WO | 2007141066 A1 | 12/2007 |
| WO | 2007147500 | 12/2007 |
| WO | 2007149134 | 12/2007 |
| WO | 2005085216 | 1/2008 |
| WO | 2008009360 | 1/2008 |
| WO | 2008066153 | 6/2008 |
| WO | 2008067911 | 6/2008 |
| WO | 2008104503 | 9/2008 |
| WO | 2009002956 | 12/2008 |
| WO | 2009029561 | 3/2009 |
| WO | 2009049851 | 4/2009 |
| WO | 2010005692 | 1/2010 |
| WO | 2010006713 | 1/2010 |
| WO | 2010069502 | 6/2010 |
| WO | 2010074747 | 7/2010 |
| WO | 2010074751 | 7/2010 |
| WO | 2010138661 | 12/2010 |
| WO | 2011138450 A2 | 11/2011 |
| WO | 2012061991 | 5/2012 |
| WO | 2012116939 | 9/2012 |
| WO | 2013178668 | 12/2013 |
| WO | 2013178670 A2 | 12/2013 |
| WO | 2013178671 | 12/2013 |
| WO | 2013178679 | 12/2013 |
| WO | 2013178697 | 12/2013 |
| WO | 2013178700 | 12/2013 |
| WO | 2013178701 | 12/2013 |
| WO | 2014067663 | 5/2014 |
| WO | 2014067663 A1 | 5/2014 |
| WO | 2014170025 | 10/2014 |
| WO | 2015082062 | 6/2015 |
| WO | 2015124302 | 8/2015 |

(56) References Cited

FOREIGN PATENT DOCUMENTS

WO   2016023693   2/2016
WO   2016041823   3/2016

OTHER PUBLICATIONS

International Preliminary Report on Patentability for PCT/EP2013/061044, dated Feb. 12, 2014. 7 pages.
International Preliminary Report on Patentability for PCT/EP2014/001723, dated Jun. 8, 2015. 16 pages.
International Preliminary Report on Patentability for PCT/EP2015/000443, dated Jan. 22, 2016. 6 pages.
International Preliminary Report on Patentability for PCT/EP2015/076072, dated May 16, 2017. 5 pages.
International Search Report for PCT/EP2013/061044, dated May 15, 2014. 2 pages.
International Search Report for PCT/EP2013/061047, dated May 22, 2014. 3 pages.
International Search Report for PCT/EP2013/061075, dated May 15, 2014. 2 pages.
International Search Report for PCT/EP2013/061076, dated May 15, 2014.2 pages.
International Search Report for PCT/EP2013/061100, dated Jul. 16, 2014. 4 pages.
International Search Report for PCT/EP2013/061100, dated Jul. 15, 2014. 4 pages.
International Search Report for PCT/EP2014/001723, dated Jan. 5, 2015. 3 pages.
International Search Report for PCT/EP2015/000443, dated Jun. 2, 2015.2 pages.
International Search Report for PCT/EP2015/000871 dated Jul. 15, 2015. 3 pages.
International Search Report for PCT/EP2015/076072, dated Feb. 29, 2016. 2 pages.
Palm fatty acid distillate (PFAD) [online] retrieved on May 21, 2018 from: https://www.neste.com/ corporate-info/sustainability/sustainable-supply-chain/pfad-residue-palm-oil-refining-process; 1 page (Year: 2018).
Plante et al. Castor Oil [online] retrieved on Jan. 13, 2016 from: http://www.dionex.com/en-us/webdocs/110518-PO-UHPLC-Castor-Oil-31May2011-LPN2822-01.pdf; 5 pages.
PubChem, Methylmeglumine, 2006. (Year: 2006) 9 pages.
Quack, et al., Fette-Seifen-Anstrichmittel 78, 200(1976). 7 pages.
Smith, J.T. et al., "Micellar Electrokinetic Capillary Chromatography with in Situ Charged Micelles. 1. Evaluation of N-D-Gluco-N-methylalkanamide Surfactants as Anionic Borate Complexes," Anal. Chem. 1994, 66, 1119-1133.
Söderlind, E. et al., "The usefulness of sugar surfactants as solubilizing agents in parenteral formulations," Elsevier, I nternational !Journal of Pharmaceutics 252 (2003) pp. 61-71, Aug 19, 2002.
Study on Synthesis and Properties of "Green" Surfactants—Glucamine derivates, Zhao Handong, Master Thesis, Southern Yangtze University, pp. 5-6, Jul. 25, 2007.
Tan et al. (Appl Microbiol Biotechnol. 47:207-211) (Year: 1997).
Tegeler, T. et al., Special Guest Editor Section: Electrically Driven Microseparation Methods for Pesticides and Metabolites: I. Micellar Electrokinetic Capillary Chromatography of Carbamate Insecticides with MEGA-Borate and SDS Surfactants, Journal of AOAC International, vol. 82, No. 6, pp. 1542-1549, Nov. 6, 1999.
The Chemistry of Coconut Oil, accessed online Jul. 12, 2018 (Year: 2018) 5 pages.
V. Bergeron, P. Cooper, C. Fischer. J. Giermanska-Kahn, D. Langevin, and A. Pouchelon, "Polydimethylsiloxane (PDMS)-based antifoams" Colloids and Surfaces A: Physicochemical and Engineering Aspects 122 (1997) 103 120. 18 pages.
Walter, A. ; Suchy, S.E. ; Vinson, P.K., "Solubility properties of the alkylmethylglucamide surfactants", Biochimica et Biophysica Acta (BBA)—Biomembranes, Elsevier, Amsterdam, NL, Amsterdam, NL, (Nov. 2, 1990), vol. 1029, No. 1, doi:10.1016/0005-2736(90)90437-S, ISSN 0005-2736, pp. 67-74, XP023354648 publication year: 1999.
Zhu, Y-P, et al., "Surface Properties of N-Alkanoyl-N-Methy Glucamines and Related Materials", J. of Surfactants and Detergents, vol. 2, No. 3, Jul. 1, 1999. 6 pages.
"Product Specification: N-octanoyl-N-methylglucamine", Jun. 29, 2000 (Jun. 29, 2000), pp. 1-1, XP055098500, Retrieved from the Internet: URL:http://www.sigmaaldrich.com/Graphics/C OfAInfo/SigmaSAPQM/SPEC/03/03129/03129-BUL K Sigma.pdf.
International Search Report for PCT/EP2013/003290, dated Feb 10, 2014. 5 pages.
International Search Report for PCT/EP2014/001722, dated Jan. 5, 2015. 3 pages.
International Search Report for PCT/EP2015/072453, dated Oct. 23, 2015. 2 pages.
International Search Report for PCT/EP2016/063433, dated Aug. 24, 2016. 2 pages.
Lichtenthaler, F.W., "Carbohydrates as Organic Raw Materials," in Ullmann's Encyclopedia of Industrial Chemistry, Wiley-VCH Verlag, 2010. (34 pages).
Synergen OS Innovation Spotlight, Sep 1, 2013, 5 pages.

* cited by examiner

AQUEOUS ADJUVANT-COMPOSITIONS

The invention relates to aqueous adjuvant compositions comprising alkylglucamides, to their use for producing aqueous pesticide compositions, and to aqueous pesticide compositions comprising alkylglucamides.

Pesticides (primarily fungicides, herbicides, and insecticides) are chemical substances produced synthetically or of natural origin that penetrate plant cells, plant tissue, or parasitic organisms in or on the plant, causing their damage and/or destruction. The largest share of the pesticides is that of herbicides. Pesticides are used customarily in the form of liquid or solid concentrated preparations (formulations) in agriculture. These preparations make handling easier for the user or ensure greater activity on the part of the active ingredient. The formulations are customarily diluted with water before use and then delivered by spray application.

Water-soluble concentrates (Soluble Liquids, abbreviated SL) are one particularly important form of pesticide preparations. They play a large part particularly for herbicides, with the pesticides often being used as water-soluble salts which are converted into their alkali metal salts or ammonium salts by neutralization of the acid form of the herbicides with suitable bases.

A particularly important part is played by the water-soluble salts of herbicides, such as, for example, of glyphosate, of glufosinate, or of the auxin herbicides such as 2,4-D or dicamba. They are used preferably as the alkali metal salt or in the form of various ammonium salts, or as a mixture of these salts, usually as aqueous formulations.

A general problem with the use of pesticides is that only a fraction of the active ingredient develops the desired activity. The greater part is often lost without being utilized, with the active ingredient failing to reach the leaves or roots of the plant when the spray mixture is delivered, and instead seeping unutilized into the soil, being washed off by rain, or simply not being properly taken up by the plant.

This environmental and economic disadvantage can be reduced by addition of auxiliaries, identified in the context of the present patent application as "adjuvants", to pesticide formulations. These auxiliaries may, for example, reduce spray drift, improve wetting of the plant, or ensure that the active ingredient adheres to the plant surface for a longer time and/or is taken up more effectively. Particularly in the case of water-soluble pesticides, such as in the case of glyphosate, for example, the nature and also the amount of the adjuvants used have a critical influence on the activity of the formulation.

By far the most commonly used adjuvants in aqueous herbicide formulations are fatty amine ethoxylates, principally tallow fatty amine ethoxylates. On account of their toxic and ecotoxicological properties, however, such as the severe eye irritation or the toxicity toward aquatic organisms, these products are classed as objectionable and are increasingly being replaced by adjuvants having a better toxicological and ecotoxicological profile.

Adjuvants which are employed in aqueous pesticide formulations are customarily in liquid form, i.e., as water-miscible solutions, in order to simplify production of the pesticide formulation. The adjuvant solutions may comprise water and/or water-miscible solvents which together with the pesticide produce a homogeneous and storage-stable aqueous formulation. Water is used as solvent if possible, being preferred for reasons not only of cost but also of the environment. Cosolvents may be used, capable of improving the solubility or the stability.

The use of sugar-based surfactants, such as alkyl-N-methylglucosamides, in cleaning products and cosmetic products, for example, is described in the literature (F. W. Lichtenthaler, "Carbohydrates as Organic Raw Materials" in Ullmann's Ullmann's Encyclopedia of Industrial Chemistry, Wiley-VCH Verlag, 2010).

WO 96/16540 describes pesticide compositions which long-chain alkylamides that carry on the amide nitrogen a polyhydroxycarbonyl substituent having at least three hydroxyl groups. Described in the examples are emulsifiable concentrates, water-dispersible powders, and granules of dodecyl-N-methylglucamide, dodecyltetradecyl-N-methylglucamide, and cetylstearyl-N-methylglucamide.

The requirements relating to adjuvants in aqueous pesticide compositions have grown continually over the years. Besides high biological activity and unobjectionability, from the standpoint both of the user and of the environment, increasingly more advantageous performance properties are being required. The adjuvants are to permit very high loading of the formulation with the active ingredient, and are to be compatible as far as possible with different active ingredients. The formulations must be storage-stable and must have a very low viscosity, in order to ensure greater ease of handling, and also must facilitate complete or near-complete emptying of the containers. Further requirements are for effective miscibility and rapid dissolution capacity, including and particularly in cold water, when the spray mixture is being prepared.

The object, accordingly, was that of providing new aqueous adjuvant compositions which are highly active, which are distinguished by a very advantageous toxicological and environmental profile, and which have properties advantageous from a performance standpoint.

The object is surprisingly achieved by new adjuvant compositions comprising
a) one or more alkylglucamides of the formula (I)

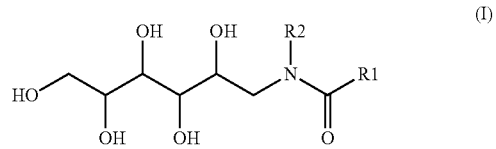

in which
R1 is a linear or branched alkyl group having 5 to 9 carbon atoms,
R2 is an alkyl group having 1 to 3 carbon atoms,
b) water
c) optionally a cosolvent.

In the one or more alkylglucamides of the formula (I), the radical R1 is preferably a linear or branched alkyl group having 7 to 9 carbon atoms. The radical R2 is preferably a methyl group.

More preferably the adjuvant compositions of the invention comprise a mixture of octyl-N-methylglucamide (R1=C$_7$ alkyl, R2=methyl) and decyl-N-methylglucamide (R1=C$_9$ alkyl, R2=methyl). The fraction of octyl-N-methylglucamide in this mixture is 10 to 90 wt %, preferably 20 to 80 wt %, and more preferably 30 to 70 wt %, based on the total amount of alkylglucamides present in said mixture. The fraction of decyl-N-methylglucamide in this mixture is 10 to 90 wt %, preferably 20 to 80 wt %, and more preferably 30 to 70 wt %, based on the total amount of alkylglucamides present in this mixture.

The pentahydroxyhexyl radical in the alkylglucamides of the formula (I) possesses different chiral centers, meaning that in each case there are a plurality of possible stereoisomers. The alkylglucamides of the formula (I) are customarily prepared from naturally occurring sugars, such as D-glucose, although in principle it is possible to use other natural or synthetic hexoses or other $C_6$ building blocks as well, and so different stereoisomers of the formula (I) may result.

The cosolvent c) included optionally may either be present as a secondary component from the alkylglucamide preparation procedure, or may have been added subsequently to the adjuvant composition. The cosolvent may comprise a single solvent or a mixture of two or more solvents. Suitable for this purpose are all polar solvents which are compatible with the aqueous pesticide composition and which form a homogeneous phase. Examples of suitable cosolvents are monohydric alcohols, such as methanol, ethanol, propanols, butanols, benzyl alcohol, or polyhydric alcohols such as ethylene glycol, diethylene glycol, propylene glycol, or glycerol, or polyglycols such as polyethylene, polypropylene, or mixed polyalkylene glycols (PAGs). Other suitable solvents are ethers such as, for example, propylene glycol monomethyl or dimethyl ether, dipropylene glycol monomethyl or dimethyl ether, amides such as N-methyl- or N-ethylpyrrolidone, for example, N, N-dimethyllactamide, N,N-dimethylcaprylamide, or N,N-dimethyldecanamide.

Particularly suitable cosolvents are mono or polyhydric alcohols, and especially suitable are dihydric or trihydric alcohols such as propylene glycol, glycerol, or polyethylene, polypropylene and/or mixed polyalkylene glycols (PAGs).

The fraction of the cosolvent in the composition is customarily 10 to 250 g/l, preferably 20 to 200 g/l, and more preferably 30 to 150 g/l.

The cosolvent may additionally contribute toward stabilizing the adjuvant compositions, by, for example, raising the low-temperature stability or heat stability, or positively influencing other performance properties such as the viscosity.

The alkylglucamides of the formula (I) are based preferably on renewable raw materials and are notable for an advantageous toxicological and environmental profile. They possess high solubility in water.

The aqueous adjuvant compositions comprise preferably 10 to 90 wt %, more preferably 20 to 80 wt %, and especially preferably 30 to 70 wt % of the one or more alkylglucamides of component a).

The aqueous adjuvant compositions of the alkylglucamides of the formula (I) are suitable as adjuvants in aqueous pesticide compositions for improving the biological activity of herbicides, insecticides, fungicides, acaricides, bactericides, molluscids, nematicides, and rodenticides.

Another subject of the invention is therefore the use of the aqueous adjuvant compositions for boosting the biological activity of pesticides, particularly of herbicides.

The aqueous adjuvant compositions are outstandingly suitable for producing storage-stable aqueous pesticide compositions which possess advantageous properties.

Another subject of the invention is therefore the use of the compositions of alkylglucamides for producing aqueous pesticide compositions. Customary methods for producing such pesticide compositions are known to the skilled person.

Also a further subject of the invention, moreover, are aqueous pesticide compositions comprising
a) one or more alkylglucamides of the formula (I)

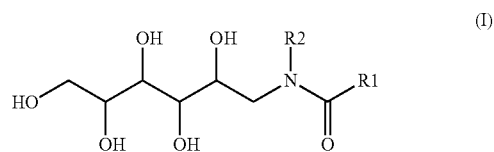

in which
R1 is a linear or branched alkyl group having 5 to 9 carbon atoms,
R2 is an alkyl group having 1 to 3 carbon atoms,
b) water
c) optionally a cosolvent,
d) one or more water-soluble pesticides.

Water-soluble pesticides for the purposes of the invention are to be understood as meaning pesticides which at room temperature (25° C.) have a solubility of more 50 g/l and preferably more than 100 g/l in water.

Preferred water-soluble pesticides are the water-soluble herbicides, among which preference is given in turn to the water-soluble salts of acifluorfen, aminopyralid, amitrole, asulam, benazolin, bentazone, bialaphos, bispyribac, bromacil, bromoxynil, bicyclopyron, chloramben, clopyralid, 2,4-D, 2,4-DB, dicamba, dichlorprop, difenzoquat, diquat, endothal, fenoxaprop, flamprop, flumiclorac, fluoroglycofen, fomesafen, fosamine, glufosinate, glyphosate, imizameth, imazamethabenz, imazomox, imazapic, imazapyr, imazaquin, imazethapyr, MCPA, MCPB, mecoprop, octanoic acid, paraquat, pelargonic acid, picloram, quizalofop, 2,3,6-TBA, and triclopyr. The precise chemical composition and structure of all of these compounds are known and can be looked up on the Internet at: www.alanwood.net/pesticides.

Particularly preferred are the water-soluble salts of 2,4-D, bentazone, dicamba, fomesafen, glyphosate, glufosinate, MCPA, and paraquat. Exceptionally preferred are the water-soluble salts of glyphosate.

Preference among the water-soluble salts is given in particular to the alkali metal salts and ammonium salts, and of these in turn to the potassium, ammonium, dimethylammonium, isopropylammonium, and (2-hydroxyethyl)trimethylammonium salts.

The water-soluble pesticides of component d) may also comprise a combination of two or more pesticides. Such combinations are important especially when the aim, for example, is to broaden the activity spectrum of the pesticide composition or more effectively to prevent resistances toward particular pesticides.

Combining two or more water-soluble pesticides in one formulation, however, is a difficult enterprise. This is because the active ingredients are customarily not compatible with one another, and the aqueous mixtures are therefore not phase-stable. Very surprisingly, however, the alkylglucamides of the formula (I) are suitable for stabilizing such fundamentally incompatible compositions, a fact which was hitherto unknown.

In a further embodiment of the invention, therefore, the pesticide compositions of the invention comprise at least two water-soluble pesticides of component d).

With preference the at least two water-soluble pesticides are selected from glyphosate, glufosinate, 2,4-D, dicamba, and fomesafen.

Particularly preferred compositions are those where the water-soluble pesticides of component d) comprise the combinations of the two herbicides glyphosate and 2,4-D, glyphosate and dicamba, glyphosate and fomesafen, glyfosate and glufosinate, 2,4-D and dicamba, glufosinate and 2,4-D, and glufosinate and dicamba.

The preparation of the alkylglucamides of the formula (I) has been well described before and is known to the skilled person. It is accomplished, for example, by condensing carboxylic esters with a secondary N-alkylglucamine, which in its turn may be prepared by reductive amination from a sugar such as D-glucose.

The alkylglucamides of the formula (I) described above can be used to produce pesticide compositions of the invention, especially aqueous herbicide formulations, having excellent performance properties.

In the formulation of aqueous pesticide compositions, a concern is to load the composition with as high a concentration of active ingredient as possible. Doing so reduces costs of packaging, transport, storage, and disposal. An adjuvant composition ought therefore to be capable of permitting stable, highly loaded pesticide compositions, known as "high-load" formulations. This is accomplished surprisingly well with the alkylglucamides of the formula (I).

In one preferred embodiment of the invention, the amount of the one or more water-soluble pesticides of component d) in the compositions of the invention is more than 100 g/l, preferably more than 200 g/l, and more preferably more than 300 g/l. These quantity figures are based on the total weight of the pesticide composition of the invention, and on the amount of free acid, or "acid equivalent" (a.e.) in the case of pesticides used in the form of their water-soluble salts (such as, customarily, glyphosate or 2,4-D, for example).

In a further preferred embodiment of the invention, the amount of the one or more alkylglucamides of the formula (I) in the pesticide compositions of the invention is 20 to 250 g/l, preferably 40 to 200 g/l, and more preferably 50 to 150 g/l. These quantity figures are based on the total amount of the pesticide composition of the invention.

The alkylglucamides of the formula (I) are used customarily in the form of solutions. For clarification here it is noted that the quantity figures stated above are based in this case on the active content of the alkylglucamides of the formula (I) in the solution.

A particularly important criterion for the storage stability of aqueous pesticide compositions such as glyphosate formulations and 2,4-D formulations, for example is the phase stability. A composition is held to be sufficiently phase-stable when it remains homogeneous over a wide temperature range and when there is no formation of two or more separate phases or of precipitates (formation of a further solid phase). Phase stability—both at elevated temperature, as may occur, for example, in the case of storage in the sun or in hot countries, and at low temperature, such as in winter or in cold climatic regions, for example—is the critical prerequisite for a storage-stable formulation.

The pesticide compositions of the invention are notable in that they are phase-stable even at a temperature of preferably greater than 55° C., more preferably of greater than 70° C., and especially preferably of greater than 80° C.

Furthermore, the pesticide compositions of the invention are notable for the fact that they are phase-stable even at a temperature of preferably less than 10° C., more preferably of less than 0° C., and especially preferably of less than −10° C.

The pH of the pesticide compositions is situated customarily in the range from 3.5 to 8.0, preferably at 4.0 to 7.0, and more preferably at 4.5 to 6.5 (measured in the form of a 1 wt % aqueous dilution). The pH is determined primarily by the pH values of the solutions of the aqueous pesticides, present in the form of salts of weak acids. By addition of acids or bases, the pH can be adjusted to a different value differing from the original pH of the mixture.

The high salt stability of the pesticide composition of the invention in an aqueous medium, even in the case of a high pesticide concentration and salt concentration, constitutes a great performance advantage. It also makes it possible for agrochemical salts such as fertilizers, for example, to be included in the composition.

In another preferred embodiment of the invention, therefore, the pesticide compositions comprise one or more agrochemical salts, preferably ammonium salts.

With particular preference the pesticide compositions comprise ammonium sulfate, ammonium nitrate, ammonium phosphate, ammonium thiocyanate and/or ammonium chloride.

The pesticide compositions of the invention may comprise one or more auxiliaries further to the one or more alkylglucamides of the formula (I), and in that case these further auxiliaries may be, for example, preservatives, surfactants, defoamers, functional polymers, or additional adjuvants.

Preservatives which can be used include organic acids and their esters, as for example ascorbic acid, ascorbyl palmitate, sorbate, benzoic acid, methyl and propyl 4-hydroxybenzoate, propionates, phenol, as for example 2-phenylphenate, 1,2-benzisothiazolin-3-one, formaldehyde, sulfurous acid, and salts thereof.

The surfactants may generally be all nonionic, amphoteric, cationic, or anionic surfactants that are compatible with the composition.

Examples of nonionic surfactants are ethoxylates and alkoxylates of relatively long-chain aliphastic or aromatic alcohols, fatty amine ethoxylates, relatively long-chain ether amine alkoxylates, (optionally ethoxylated) sorbitan esters, and alkylpolyglycosides. Suitable amphoteric surfactants include long-chain alkyldimethylbetaines or alkyldimethylamine oxides, or alkyldimethylamineamidopropylamine oxides. Suitable among the anionic surfactants, for example, are ether sulfates of ethoxylated fatty alcohols, reaction products of (optionally ethoxylated) long-chain alcohols with phosphoric acid derivatives. Suitability under "long-chain" is possessed by linear or branched hydrocarbon chains having at least 6 and not more than 22 carbon atoms.

Suitable defoamers are fatty acid alkyl ester alkoxylates, organopolysiloxanes such as polydimethylsiloxanes and mixtures thereof with microfine, optionally silanized silica; perfluoroalkylphosphonates and -phosphinates, paraffins, waxes, and microcrystalline waxes, and mixtures thereof with silanized silica. Also advantageous are mixtures of different foam inhibitors, examples being those composed of silicone fluid, liquid paraffin and/or waxes.

The functional polymers which may be present in the pesticide composition of the invention are high molecular mass compounds of synthetic or natural origin with a molar mass of greater than 10 000. The functional polymers may for example act as antidrift agents or may boost rain resistance.

In a further preferred embodiment of the invention, the pesticide compositions of the invention comprise one or more adjuvants further to the one or more alkylglucamides of component a), such adjuvants being those as may conventionally be used in aqueous pesticide compositions.

These are, preferably, fatty amine ethoxylates, ether amine ethoxylates, alkylbetaines or amidoalkylbetaines, amine oxides or amidoalkylamine oxides, alkylpolyglycosides, or copolymers of glycerol, coconut fatty acid, and phthalic acid.

These adjuvants are known from the literature as adjuvants in aqueous pesticide compositions and are described in WO2009/029561, for example.

In a further preferred embodiment of the invention, the pesticide compositions of the invention take the form of concentrated formulations which are diluted prior to use, in particular with water (examples being "ready-to-use", "in-can", or "built-in" formulations), and they comprise the one or more water-soluble pesticides of component d) in amounts of 5 to 80 wt %, preferably of 10 to 70 wt %, and more preferably of 20 to 60 wt %, and the one or more alkylglucamides of the formula (I) in amounts of 1 to 25 wt %, preferably of 2 to 20 wt %, and more preferably of 3 to 15 wt %. These quantity figures are based on the overall concentrated formulation, and on the amount of free acid, the "acid equivalent" (a.e.), in the case of pesticides which are used in the form of their water-soluble salts.

The pesticide compositions of the invention are applied to the fields preferably in the form of spray mixtures. These spray mixtures are produced by diluting concentrated formulations with a defined quantity of water.

In a further preferred embodiment of the invention, the compositions of the invention are in the form of spray mixtures and comprise 0.001 to 10 wt %, preferably 0.02 to 3 wt %, and more preferably 0.025 to 2 wt % of the one or more water-soluble pesticides of component d) and 0.001 to 3 wt %, preferably 0.005 to 1 wt %, and more preferably 0.01 to 0.5 wt % of the one or more alkylglucamides of the formula (I). The stated quantity figures are based on the overall spray mixture, and on the amount of free acid, the "acid equivalent" (a.e.), in the case of pesticides which are used in the form of their water-soluble salts.

The invention further relates to the use of the pesticide compositions of the invention for the checking and/or for the control of weeds, fungal diseases, or insect infestation. Preference is given to the use of the compositions of the invention for controlling and/or for checking weeds.

These uses may preferably also take place by what is called a tank-mix method. In this scenario, then, the one or more water-soluble pesticides of component d) and the one or more alkylglucamides of the formula (I), and also the water, may also take the form of what is called a "tank-mix" preparation. In such a preparation, both the one or more water-soluble pesticides and the one or more alkylglucamides of the formula (I)—the latter optionally together with further adjuvants—are present separately from one another. Prior to application, generally a short time before, the two preparations are mixed with one another, producing a pesticide composition of the invention.

WORKING EXAMPLES

The invention is illustrated further below for the skilled person, using examples which, however, should not be considered in any way as confining the invention to the embodiments shown.

Example 1: Production of an Inventive Aqueous Alkylglucamide Composition

The alkylglucamide was prepared from a commercially available $C_8/C_{10}$ carboxylic acid methyl ester ($C_8$ fraction 55 wt %, $C_{10}$ fraction 45 wt %) by reaction with N-methylglucamine in propylene glycol as described in WO 92/06073. A mixture was formed which as well as 90 wt % of the alkylglucamide of the formula (I) $R1=C_8H_{17}$ and $C_{10}H_{21}$, $R2=CH_3$, also contained 10 wt % of propylene glycol from the reaction mixture. 60 g of this mixture were dissolved in 40 g of water. This gave a stable aqueous solution of the C8/10-N-methylglucamide with a content of 54 wt % in water/propylene glycol.

Example 2: Attempted Production of a Non-Inventive Aqueous Alkylglucamide Composition (Comparative Example)

The alkylglucamide was prepared from a commercially available $C_{12}/C_{14}$ carboxylic acid methyl ester ($C_{12}$ fraction 69 wt %, $C_{14}$ fraction 25 wt %, other chain constituents 6 wt %) by reaction with N-methylglucamine in propylene glycol as described in WO 92/06073. This gave a mixture which as well as 90 wt % of the alkylglucamide of the formula (I) $R1=C_{12}H_{23}$ and $C_{14}H_{29}$, $R2=CH_3$, also contained 10 wt % of propylene glycol from the reaction mixture. An attempt was made to dissolve this mixture in water, in analogy to example 1, but no stable solutions were obtained. The results are compiled in Table 1.

Example 3: Attempted Production of a Non-Inventive Aqueous Alkylglucamide Composition (Comparative Example)

The alkylglucamide was prepared from a commercially available $C_{16}/C_{18}$ carboxylic acid methyl ester ($C_{16}$ fraction 38 wt %, $C_{18}$ fraction 60 wt %, other chain constituents 2 wt %) by reaction with N-methylglucamine in propylene glycol as described in WO 92/06073. This gave a mixture which as well as 90 wt % of the alkylglucamide of the formula (I) $R1=C_{16}H_{33}$ and $C_{18}H_{37}$, $R2=CH_3$, also contained 10 wt % of propylene glycol from the reaction mixture. An attempt was made to dissolve this mixture in water, in analogy to example 1, but no stable solutions were obtained. The results are compiled in Table 1.

TABLE 1

Dissolution tests of the relatively long-chain alkylglucamides in water

| Example 2 Fraction of $C_{12/14}$ glucamide in wt % in water | Example 3 Fraction of $C_{16/18}$ glucamide in wt % in water | Observations |
|---|---|---|
| 60 | | Not soluble |
| 20 | | Soluble with heating, forms firm gel on cooling |
| 10 | | Soluble with heating, forms firm gel on cooling |
| | 60 | Not soluble |
| | 20 | Soluble with heating, forms firm gel on cooling |
| | 10 | Soluble with heating, forms firm gel on cooling |

Since it was not possible to produce stable and manageable solutions of the $C_{12/14}$ glucamide, a 20 wt % strength solution in propylene glycol was prepared for the biological tests and the formulation experiments. With the $C_{16/18}$ glucamide, preparing a propylene glycol solution in the same concentration was not possible.

Example 4: Biological Activity of the Adjuvant Compositions

For the purpose of determining the biological activity, greenhouse trials were carried out with glyphosate on *Echi-* nochloa crus-galli (L.) Beauv. (ECHCG), *Cirsium arvense* L. (CIRAR), and *Solanum nigrum* L. (SOLNI). The plants were cultivated in a greenhouse under 14 hours of irradiation with light at a temperature of 19/14 (±0.5°) C. (day/night) and a relative humidity of 70/80 (±5)% (day/night). The light was supplied via high-pressure sodium lamps, high-pressure mercury lamps, and fluorescent tubes, producing a power of 70 W/m² at the leaf level. The plants were grown in 12 cm diameter plastic pots filled with a mixture of sand and humus in a sand:humus ratio of 1:2 by volume.

The pots were placed on an under-soil watering mat, which was wetted daily with a medium-strength nutrient solution. Following their appearance at the substrate surface, seedlings were thinned out to five (ECHCG), two (CIRAR), or one (SOLNI) plant per pot for the activity tests.

The spray solutions were applied using a laboratory sprayer operated with compressed air and fitted with a Teejet TP8003E nozzle at an application rate of 200 l/ha to the plants at 303 kPa. ECHCG was treated at the two- to three-leaf stage; CIRAR and SOLNI were treated at the four-leaf stage.

For the more differentiated examination of the adjuvant effect, the glyphosate active ingredient was underdosed, meaning that the plants are not completely killed. This was done using aqueous solutions of glyphosate-isopropylammonium salt (glyphosate IPA). The amount of glyphosate used was 33.8 g a.e./ha glyphosate IPA (corresponding to 1.0 mmol or 0.17 g a.e./l for a liquid volume of 200 l/ha) in the case of ECHCG, and at 20.3 g a.e./ha glyphosate IPA (corresponding to 0.6 mmol or 0.10 g a.e./l at a liquid volume of 200 l/ha) for CIRAR and SOLNI.

The amount of adjuvant in each of the spray solutions was 0.25 wt %. The differences in the active contents of the products employed were taken into account. The amounts used were corrected—that is, the figure of 0.25 wt % referred in all cases to 100% active content of the adjuvants—and are therefore comparable with one another.

An overview of the alkylglucamides and comparison substances tested is given below in Table 2.

TABLE 2

Overview of adjuvants A1 to A4 used

| Adjuvant | Composition |
|---|---|
| A1 (inventive) | $C_8/C_{10}$-alkyl-N-methylglucamide from example 1, 54 wt % strength solution in water/propylene glycol |
| A2 (comparative) | $C_{12}/C_{14}$-alkyl-N-methylglucamide from example 2, 20 wt % strength solution in propylene glycol |
| A3 (comparative) | Genamin ® 267 (tallow fatty amine ethoxylate with 15 mol EO; product of Clariant), 70 wt % strength solution in glycols |
| A4 (comparative) | Synergen ® GL 5 (copolymer consisting of glycerol, coconut fatty acid, and phthalic acid; product of Clariant), 70 wt % strength solution in water |

The activity of the various adjuvants was assessed 14 days after application, by determining the mass of the plant parts still present (fresh weight; FW), and was reported as a percentage fraction, relative to the untreated plant (Table 3).

TABLE 3

Effect of adjuvants on activity of glyphosate IPA

| | FW in % (ECHCG) | FW in % (CIRAR) | FW in % (SOLNI) |
|---|---|---|---|
| Untreated plant | 100 | 100 | 100 |
| Glyphosate IPA without adjuvant | 74.3 | 95.9 | 84.5 |
| Glyphosate + A1 | 1.5 | 31.9 | 19.2 |
| Glyphosate + A2 | 42.9 | 62.2 | 29.7 |
| Glyphosate + A3 | 3.2 | 14.4 | 8.7 |
| Glyphosate + A4 | 4.0 | 33.0 | 40.9 |

The result of the experiments shows that the inventive adjuvant composition based on the $C_8/C_{10}$-alkyl-N-methylglucamide (see A1) is much more effective than that based on the longer-chain, non-inventive $C_{12}/C_{14}$-alkyl-N-methylglucamide (see A2). At the same time a comparable (or higher) activity is achieved than with the commercial products Genamin 267 (see A3) or Synergen GL 5 (see A4).

Example 5: Aqueous Glyphosate Compositions

Two inventive pesticide compositions were produced from a commercial aqueous solution of glyphosate-isopropylammonium salt (62 wt % strength in water), the adjuvant composition A1, and water. The resulting compositions I1 and I2 contain 360 and 480 g/l glyphosate a.e. (a.e.: acid equivalent).

For comparison, two non-inventive pesticide compositions were produced with the $C_{12}/C_{14}$-alkyl-N-methylglucamide (A2) and also Genamin 267 (A3) and Synergen GL 5 (A4). The cloud point and the viscosity of the compositions were determined.

The cloud point was determined by heating the composition, which was heated until clouding occurred. Thereafter the composition was cooled with stirring and continual temperature monitoring. The temperature at which the clouded solution turns clear again was recorded as the cloud point value.

The results are set out in Tables 4 and 5 below.

TABLE 4

Glyphosate IPA 360 g/l a.e. formulations

| | Composition | | | |
|---|---|---|---|---|
| | I1 ($C_8/C_{10}$—N-methyl glucamide, A1) | C1 ($C_{12}/C_{14}$—N-methyl glucamide, A2) | C2 (Genamin 267, A3) | C3 (Synergen GL 5, A4) |
| Glyphosate IPA (62 wt % strength in $H_2O$) [g] | 78.4 | 78.4 | 78.4 | 104.4 |
| Adjuvant (as is) [g] | 12 | 18 | 12 | 12 |
| Adjuvant (calculated on 100 wt %) [g] | 6.5 | 3.8 | 8.4 | 8.4 |
| Water [g] | 26.6 | 20.6 | 26.6 | 26.6 |
| Cloud point [° C.] | >95 | — | 87 | 57 |
| Viscosity at 25° C. [mPa · s] | 25 | solid | 50 | 53 |

With the non-inventive $C_{12}/C_{14}$-alkyl-N-methylglucamide (A2) it was not possible to produce a stable glyphosate formulation (experiment C1); only a firm-consistency gel was formed. No attempt was therefore made to produce a glyphosate composition with an even higher loading (experiment C4).

TABLE 5

Glyphosate IPA 480 g/l a.e. formulations

| | Composition | | | |
|---|---|---|---|---|
| | I2 (C$_8$/C$_{10}$—N-methyl glucamide, A1) | C4 (C$_{12}$/C$_{14}$—N-methyl glucamide, A2) | C5 (Genamin 267, A3) | C6 (Synergen GL 5, A4) |
| Glyphosate IPA (62 wt % strength in water) [g] | 104.4 | — | 104.4 | 104.4 |
| Adjuvant (as is) [g] | 12 | — | 12 | 12 |
| Adjuvant (calculated on 100 wt %) [g] | 6.5 | — | 8.4 | 8.4 |
| Water [g] | 3.6 | — | 3.6 | 3.6 |
| Cloud point [° C.] | >95 | — | separates at 25° C. | 64 |
| Viscosity at 25° C. [mPa · s] | 95 | — | — | 205 |

The experiments make it clear that the inventive adjuvant composition (=A1) gave both stable 360 g/l a.e. and stable 480 g/l a.e. glyphosate IPA formulations, which are distinguished by more advantageous applications properties, specifically by higher cloud point and hence at the same time a lower viscosity as well, in comparison to the non-inventive C$_{12}$/C$_{14}$-alkyl-N-methylglucamide (A2) and to the commercial products Genamin 267 (A3) and Synergen GL 5 (A4).

Example 6: Aqueous 2,4-D-DMA Compositions

An inventive pesticide composition was produced from 76.0 g of aqueous 2,4-D-dimethylammonium salt solution (69 wt % strength), 15.0 g of adjuvant composition A1, and 14.5 g of water. The formulation had an active content of 440 g/l a.e. (acid equivalent) based on 2,4-D. The phase stability of the formulation was determined by ascertaining the cloud point and also the low-temperature stability at 0° C. and −10° C. The formulation showed a cloud point of >95° C. and was homogeneous and phase-stable after storage for a duration of 24 hours both at 0° C. and at −10° C.

Example 7: Aqueous Glyphosate/2,4-D Compositions

Inventive combined glyphosate/2,4-D formulations in three (3) different proportions (I3, I4, and I5) were produced from aqueous solutions of glyphosate-isopropylammonium salt (62 wt % strength), 2,4-D-dimethylammonium salt (69 wt % strength), and the adjuvant composition A1 (see Table 6).

Serving for comparison in each case were three non-inventive compositions, containing Genamin 267 (C7, C8, and C9) and Synergen GL 5 (C10, C11, and C12) in place of A1 (Table 6).

TABLE 6

Combined glyphosate/2,4-D formulations

| Experiment | Acid equivalent (glyphosate/2,4-D) [g/l] | Glyphosate-IPA (62 wt % strength in water) [g] | 2,4-D DMA (69 wt % strength in water) [g] | Propylene glycol [g] | Water [g] | Adjuvant composition (amount) [g] |
|---|---|---|---|---|---|---|
| I3 | 300 + 100 | 35.6 | 9.5 | 4.5 | 6.4 | A1 (9.0) |
| I4 | 200 + 200 | 23.7 | 18.9 | 4.5 | 8.9 | A1 (9.0) |
| I5 | 100 + 300 | 11.9 | 28.6 | 0 | 15.5 | A1 (9.0) |
| C7 | 300 + 100 | 35.6 | 9.5 | 5.0 | 7.9 | A3 (7.0) |
| C8 | 200 + 200 | 23.7 | 18.9 | 5.0 | 10.4 | A3 (7.0) |
| C9 | 100 + 300 | 11.9 | 28.6 | 0 | 17.5 | A3 (7.0) |
| C10 | 300 + 100 | 35.6 | 9.5 | 5.0 | 7.9 | A4 (7.0) |
| C11 | 200 + 200 | 23.7 | 18.9 | 5.0 | 10.4 | A4 (7.0) |
| C12 | 100 + 300 | 11.9 | 28.6 | 0 | 17.5 | A4 (7.0) |

For all formulations, the phase stability was ascertained by determination of the cloud point, and also the low-temperature stability at 0° C. and −10° C. The results are shown in Table 7 below.

TABLE 7

Cloud points and low-temperature stability of the compositions

| Experiment | Cloud point [° C.] | Appearance at 25° C. | Appearance at 0° C. | Appearance at −10° C. |
|---|---|---|---|---|
| I3 | >95 | homogeneous | homogeneous | homogeneous |
| I4 | >95 | homogeneous | homogeneous | homogeneous |
| I5 | >95 | homogeneous | homogeneous | homogeneous |
| C7 | not determined | separates | separates | separates |
| C8 | not determined | separates | separates | separates |
| C9 | >95 | homogeneous | homogeneous | homogeneous |
| C10 | >95 | homogeneous | separates | separates |
| C11 | >95 | homogeneous | homogeneous | separates |
| C12 | >95 | homogeneous | homogeneous | homogeneous |

The results of these experiments show that the inventive combined formulations were much more stable over a broader range than similar compositions based on the commercial products Genamin 267 and Synergen GL 5.

What is claimed is:

1. An aqueous solution of an adjuvant composition comprising
   a) a mixture of two alkyl-N-glucamides of the formula (I)

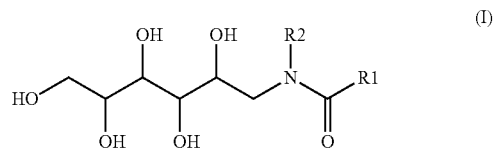

in which
   R1 is a linear or branched alkyl group having 7 or 9 carbon atoms,
   R2 is an alkyl group having 1 carbon atom,
   wherein the fraction of the alkyl-N-glucamide wherein R1 is a linear or branched alkyl group having 7 carbon atoms, is 10 to 90 wt %, and the fraction of the alkyl-N-glucamide wherein R1 is a linear or branched alkyl group having 9 carbon atoms, is 10 to 90 wt %, based on the total amount of alkylglucamides present in the mixture, b) water and
c) optionally a cosolvent, with the proviso, that the total amount of component a) is at least 30 wt %, based on the total weight of the composition and with the proviso that no further alkyl-N-glucamide is present in the aqueous solution.

2. The aqueous solution of an adjuvant composition as claimed in claim 1, wherein the fraction of the alkylglucamide wherein R1 is a linear or branched alkyl group having 7 carbon atoms, is 20 to 80 wt %, and the fraction of the alkylglucamide wherein R1 is a linear or branched alkyl group having 9 carbon atoms, is 20 to 80 wt %, based on the total amount of alkylglucam ides present in the mixture.

3. The aqueous solution of an adjuvant composition as claimed in claim 1, wherein the fraction of the alkylglucamide wherein R1 is a linear or branched alkyl group having 7 carbon atoms, is 30 to 70 wt %, and the fraction of the alkylglucamide wherein R1 is a linear or branched alkyl group having 9 carbon atoms, is 30 to 70 wt %, based on the total amount of alkylglucam ides present in the mixture.

4. The aqueous solution of an adjuvant composition as claimed in claim 1, wherein the total amount of component a) is between 30 and 90 wt %, based on the total weight of the composition.

5. A method for boosting the biological activity of a pesticide,
comprising the step of adding at least one adjuvant composition as claimed in claim 1 to the pesticide.

6. An aqueous solution of an adjuvant composition consisting essentially of
a) a mixture of two alkylglucam ides of the formula (I)

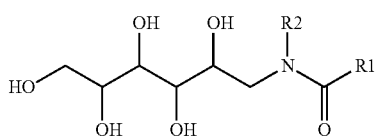

in which
R1 is a linear or branched alkyl group having 7 or 9 carbon atoms,
R2 is an alkyl group having 1 carbon atom,
wherein the fraction of the alkylglucamide wherein R1 is a linear or branched alkyl group having 7 carbon atoms, is 10 to 90 wt %, and the fraction of the alkylglucamide wherein R1 is a linear or branched alkyl group having 9 carbon atoms, is 10 to 90 wt %, based on the total amount of alkylglucam ides present in the mixture, and
b) water, with the proviso, that the total amount of component a) is at least 30 wt %, based on the total weight of the composition.

7. An aqueous solution of an adjuvant composition consisting essentially of
a) a mixture of two alkylglucamides ides of the formula (I)

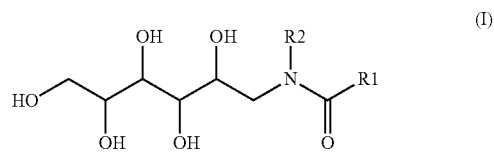

in which
R1 is a linear or branched alkyl group having 7 or 9 carbon atoms,
R2 is an alkyl group having 1 carbon atom,
wherein the fraction of the alkylglucamide wherein R1 is a linear or branched alkyl group having 7 carbon atoms, is 10 to 90 wt %, and the fraction of the alkylglucamide wherein R1 is a linear or branched alkyl group having 9 carbon atoms, is 10 to 90 wt %, based on the total amount of alkylglucamides present in the mixture,
b) water and
c) a cosolvent, with the proviso, that the total amount of component a) is at least 30 wt %, based on the total weight of the composition.

8. The aqueous solution of an adjuvant composition as claimed in claim 6, wherein the fraction of the alkylglucamide wherein R1 is a linear or branched alkyl group having 7 carbon atoms, is 20 to 80 wt %, and the fraction of the alkylglucamide wherein R1 is a linear or branched alkyl group having 9 carbon atoms, is 20 to 80 wt %, based on the total amount of alkylglucamides present in the mixture.

9. The aqueous solution of an adjuvant composition as claimed in claim 6, wherein the fraction of the alkylglucamide wherein R1 is a linear or branched alkyl group having 7 carbon atoms, is 30 to 70 wt %, and the fraction of the alkylglucamide wherein R1 is a linear or branched alkyl group having 9 carbon atoms, is 30 to 70 wt %, based on the total amount of alkylglucamides present in the mixture.

10. The aqueous solution of an adjuvant composition as claimed in claim 6, wherein the total amount of component a) is between 30 and 90 wt %, based on the total weight of the composition.

11. The aqueous solution of an adjuvant composition as claimed in claim 7, wherein the fraction of the alkylglucamide wherein R1 is a linear or branched alkyl group having 7 carbon atoms, is 20 to 80 wt %, and the fraction of the alkylglucamide wherein R1 is a linear or branched alkyl group having 9 carbon atoms, is 20 to 80 wt %, based on the total amount of alkylglucamides present in the mixture.

12. The aqueous solution of an adjuvant composition as claimed in claim 7, wherein the fraction of the alkylglucamide wherein R1 is a linear or branched alkyl group having 7 carbon atoms, is 30 to 70 wt %, and the fraction of the alkylglucamide wherein R1 is a linear or branched alkyl group having 9 carbon atoms, is 30 to 70 wt %, based on the total amount of alkylglucamides present in the mixture.

13. The aqueous solution of an adjuvant composition as claimed in claim 7, wherein the total amount of component a) is between 30 and 90 wt %, based on the total weight of the composition.

* * * * *